Figure 1:
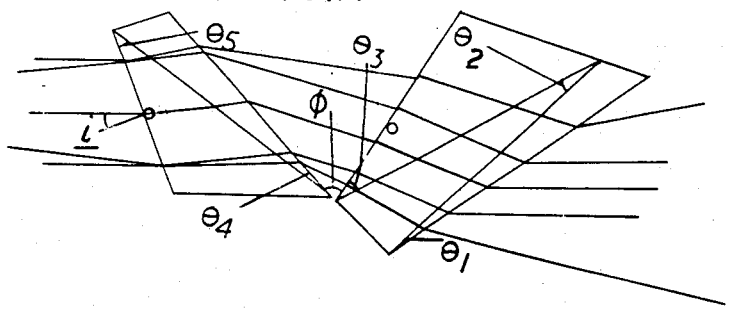

Jan. 28, 1958 K. R. COLEMAN 2,821,111
ANAMORPHOTIC OPTICAL SYSTEMS
Filed Sept. 22, 1955 3 Sheets-Sheet 1

INVENTOR
Kenneth R. Coleman
BY
ATTORNEYS

Jan. 28, 1958 K. R. COLEMAN 2,821,111
ANAMORPHOTIC OPTICAL SYSTEMS
Filed Sept. 22, 1955 3 Sheets-Sheet 2

INVENTOR
Kenneth R. Coleman
BY
ATTORNEYS

Jan. 28, 1958 K. R. COLEMAN 2,821,111
ANAMORPHOTIC OPTICAL SYSTEMS
Filed Sept. 22, 1955 3 Sheets-Sheet 3
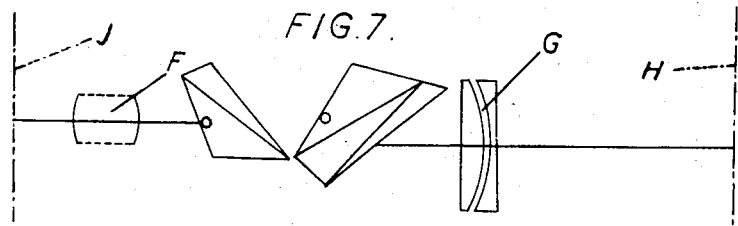
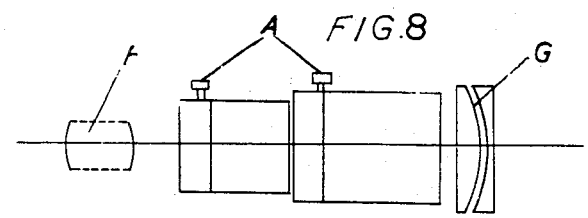
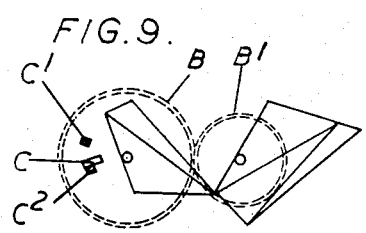
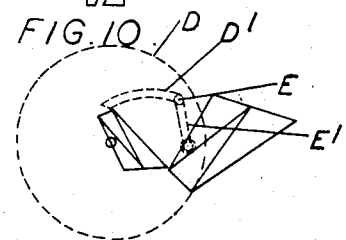
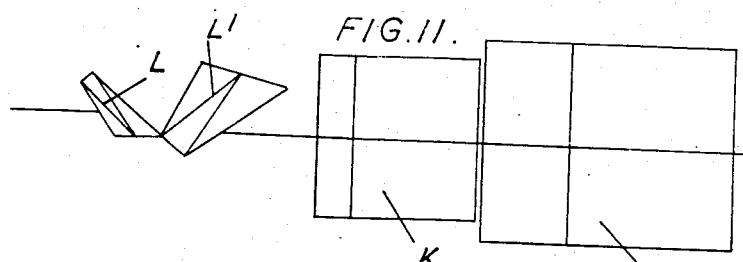
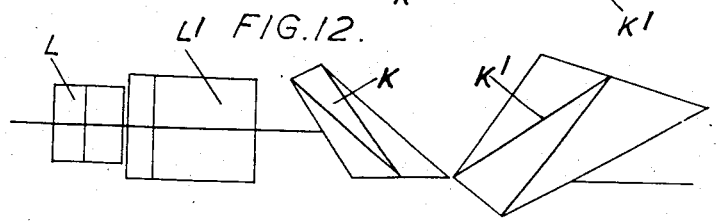
INVENTOR
Kenneth R. Coleman
BY
ATTORNEYS

United States Patent Office 2,821,111
Patented Jan. 28, 1958

2,821,111
ANAMORPHOTIC OPTICAL SYSTEMS
Kenneth Roy Coleman, Leicester, England, assignor to Taylor, Taylor & Hobson Limited, Leicester, England, a British company Application September 22, 1955, Serial No. 535,875
Claims priority, application Great Britain September 22, 1954

16 Claims. (Cl. 88—57)

This invention relates to an anamorphotic optical system, comprising two refracting compound prisms so arranged that an incident ray will be deviated in one sense by the first compound prism and in the reverse sense by the second compound prism. The total deviation of an incident ray by such a system will depend on its angle of incidence on the first surface, and the term "axial ray" is herein used to denote a ray which emerges from the system parallel to its direction of incidence. It is to be noted that an incident collimated beam composed of axial rays will not only be deviated by the compound prism on which it is incident, but will also be reduced (or enlarged) in cross-section, and this action will be repeated at the other compound prism, the reduction (or enlargement) of course taking place only in a plane at right angles to the generators of the prisms, the dimensions of the beam at right angles to such plane remaining unaltered. This change in width of an axial collimated beam may conveniently be termed "lateral pupil compression (or enlargement)." At the same time, the angle between two oblique incident rays will be decreased (or increased) in their passage through the system, in the operative plane at right angles to the prism generators, but will remain unaltered in a plane at right angles thereto. Such change in angle may be termed "lateral angular compression (or enlargement)," and it is particularly to be noted that lateral pupil compression and lateral angular compression are operative in opposite senses, so that a beam passing through the system in one direction will suffer lateral angular compression and lateral pupil enlargement, whilst a beam passing through the system in the opposite direction will suffer lateral angular enlargement and lateral pupil compression. It will thus be clear that the system has an overall magnification factor in the operative plane equal to the reduction in width of pupil, but leaves the dimensions and direction of a beam unaltered in the plane at right angles thereto.

The anamorphotic system is primarily intended for use in front of a main objective, that is on the long conjugate side of the objective, and it is to be understood that the terms "front" and "rear," as applied herein to the anamorphotic system, are to be interpreted in the same sense as for the main objective with which it is to be used, so that the rear of the anamorphotic system is the side thereof adjacent to the main objective whilst the front of such system is the side remote from the objective.

The present applicant's copending United States of America application Serial No. 428,616, now Patent No. 2,792,751, relates to a system of this kind, having each of the two compound prisms in the form of a doublet, in which the prism elements have their apices pointing in opposite directions, the apices of the two inner prism elements of the system pointing in the same direction, wherein an axial ray incident on the system from the front is deviated by the front doublet in a sense away from the apices of the inner prism elements and by the rear doublet in a sense towards such apices, the portion of such axial ray within each prism element being inclined to the normal to the cemented surface at an angle which exceeds by at least five degrees the angle between such ray portion and the normal to the air-exposed surface of the prism element, the Abbé V number of the front prism element of each doublet exceeding that of the associated rear prism element by at least 10. This arrangement is such as to enable the two compound prisms to be angularly adjusted about axes parallel to the generators of the prism surfaces to vary the magnification of the system and to maintain correction for axial colour over a wide range of magnification. This is achieved, however, by the use of small prism angles and large air angles, which makes the complete system unduly long.

The present applicant's copending United States of America application Serial No. 430,311 also relates to systems of this kind, wherein each compound prism is arranged to depart from achromatism to such an extent that the difference between the deviations of an axial ray through the compound prism for the C and F spectrum lines lies between .01 and .1 of a degree. In this way, in addition to correction for axial colour, a limited degree of correction for oblique colour can also be maintained over an appreciable range of magnification or alternatively a high degree of correction for oblique colour over a narrow magnification range.

The present invention has for its primary object to provide an improved system whereby a high degree of correction for axial colour can be satisfactorily maintained over a wide magnification range, without undue length in the system. A further object is still further to improve the system to maintain good correction for oblique colour, in addition to axial colour, over a wide magnification range.

The anamorphotic system, according to the present invention, comprises two refracting compound prisms so arranged that an incident ray will be deviated in one sense by the first compound prism and in the reverse sense by the second compound prism to an extent sufficient to include an axial ray within the useful field, the front compound system being in the form of a triplet, the middle element of which is made of material having Abbé V number less than 45, whilst each of the outer elements has its apex pointing in a direction opposite to that of the middle element and is made of material whose Abbé V number is greater than 45 and exceeds that of the middle element by at least 10, the prism angle of the front element lying between 0.1 and 1.5 times the prism angle of the rear element. The prism angle of such rear element preferably lies between 10° and 40°, whilst that of the middle element lies between 9° and 25° and is less than the sum of the prism angles of the front and rear elements by more than 10°.

The rear compound prism can be arranged in various ways.

Thus, the rear compound prism may be in the form of a doublet with the apices of its two elements pointing in opposite directions, the front element being made of material having Abbé V number less than 45, whilst the rear element is made of material having Abbé V number greater than 45 and exceeding that of the front element by at least 10, such rear element having a prism angle at least 6° greater than the prism angle of the front element. In such case, the prism angle of the front element of the front compound prism preferably lies between 0.1 and 0.67 times the prism angle of the rear element of such compound prism.

Alternatively, the rear compound prism may be in the form of a triplet, whose middle element has its apex pointing in a direction opposite to those of the outer elements, the material of the middle element having Abbé V number less than 45, whilst those of the outer elements each have Abbé V number greater than 45 and exceeding that of the middle element by at least 10, the sum of the prism angles of the outer elements exceeding the prism angle of the middle element by at least six degrees. In such case, the prism angle of the front element of the front compound prism preferably lies between .67 and 1.5 times that of the rear element of such compound prism.

In these arrangements, it is advantageous to employ the same materials for the elements of one compound prism as for those of the other compound prism.

Variation of the magnification of the system may be effected by angularly adjusting the two compound prisms about axes parallel to the prism surfaces. In such case, it is desirable so to choose the relative angular movements that an incident ray, which in one position of adjustment emerges parallel to its original direction of incidence, will also emerge parallel to its original direction in all other positions of adjustment. The two compound prisms may be so arranged that in one position in the range of adjustment each compound prism is approximately achromatic.

Figure 2:
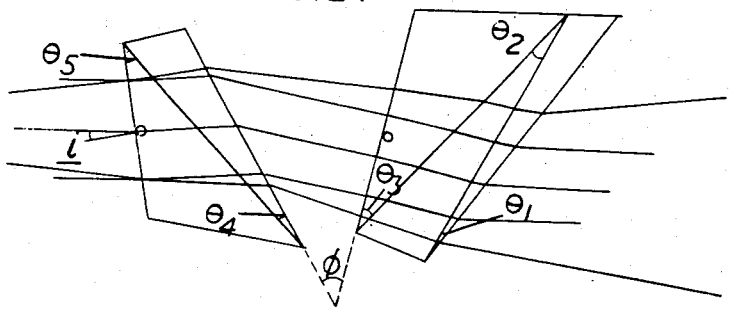
Figure 3:
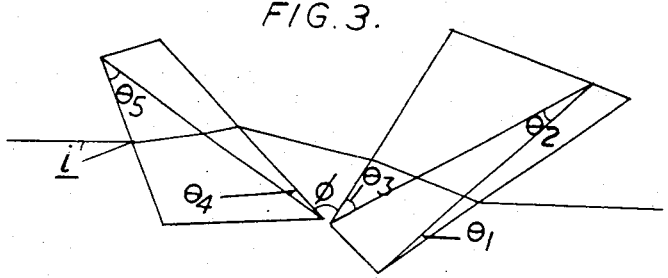
Figure 4:
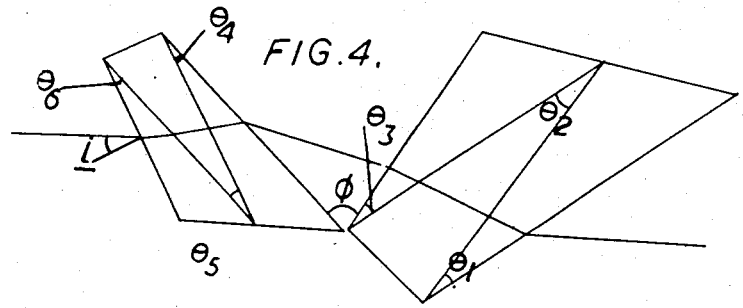
Figure 5:
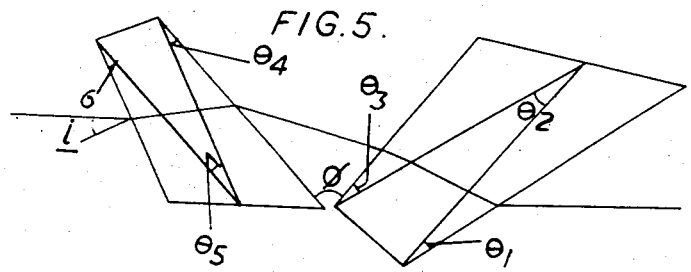
Figure 6:
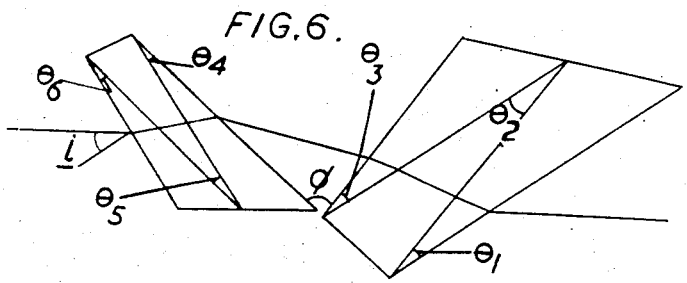

The invention may be carried into practice in various ways, but some convenient alternative examples of anamorphotic optical system according to the invention are diagrammatically illustrated by way of example in the accompanying drawings, in which Figure 1 illustrates an example having a triplet front compound prism and a doublet rear compound prism shown in its position of maximum magnification, Figure 2 shows the example of Figure 1 in its position of minimum magnification, Figure 3 illustrates another example having a triplet front compound prism and a doublet rear compound prism, Figures 4-6 respectively illustrate three further examples each having both compound prisms in the form of triplets, Figures 7 and 8 are views respectively parallel to and at right angles to the prism generators showing the example of Figure 1 applied by way of example to an optical projection arrangement, Figure 9 illustrates one form of mechanism for adjusting the magnification of the anamorphotic system as applied to the example of Figure 1, Figure 10 illustrates an alternative form of adjusting mechanism as applied to the example of Figure 6, and Figures 11 and 12 are views at right angles to one another showing the use of two similar anamorphotic systems according to the invention having their prism generators at right angles to one another for increasing the effective angular field of the objective with which they are used.

Numerical data for the examples of Figure 1 and Figures 3-6 are given respectively in the following five tables. In each of these tables, the first portion gives for each of the prism elements, counting from the front, the apex angle $\theta$ in degrees, the refractive indices $N_C$, $N_d$ and $N_F$ respectively for the C, d and F spectrum lines of the material of which the element is made, and also the Abbé V number for such material. The second portion of each table is concerned with angular adjustment of the two compound prisms to vary the magnification of the system, and gives data for various positions of adjustment for an axial ray passing through the system from the rear to the front, such data comprising the angle of incidence $i$ in degrees of the ray to the normal to the rear surface of the rear compound prism (the positive sign indicating that the ray is on the side of the normal remote from the "closed" side of the system, that is the side of the system towards which the apex of the prismatic air space between the two compound prisms points in the position of highest magnification, whilst the negative sign indicates that the ray is on the side of the normal nearer to such closed side), the angle $\phi$ in degrees between the rear surface of the front compound prism and the front surface of the rear compound prism (the positive sign indicating that such angle points towards the closed side and the negative sign that it points away therefrom), and the overall magnification M of the system.

*Example I*

|   | $\theta$ | $N_C$ | $N_d$ | $N_F$ | V |
|---|---|---|---|---|---|
| Prism 1 | 8.0 | 1.51385 | 1.51633 | 1.52191 | 64.1 |
| Prism 2 | 14.48 | 1.61546 | 1.62049 | 1.63258 | 36.2 |
| Prism 3 | 29.0 | 1.51385 | 1.51633 | 1.52191 | 64.1 |
| Prism 4 | 12.27 | 1.61546 | 1.62049 | 1.63258 | 36.2 |
| Prism 5 | 33.25 | 1.51385 | 1.51633 | 1.52191 | 64.1 |

| $i$ | $\phi$ | M |
|---|---|---|
| +22.14 | +75.25 | 1.96 |
| +19.93 | +69.39 | 1.76 |
| +16.10 | +60.07 | 1.54 |
| +10.00 | +44.71 | 1.31 |

*Example II*

|   | $\theta$ | $N_C$ | $N_d$ | $N_F$ | V |
|---|---|---|---|---|---|
| Prism 1 | 7.0 | 1.50727 | 1.50970 | 1.51518 | 64.4 |
| Prism 2 | 14.15 | 1.61546 | 1.62049 | 1.63258 | 36.2 |
| Prism 3 | 30.0 | 1.50727 | 1.50970 | 1.51518 | 64.4 |
| Prism 4 | 12.08 | 1.61546 | 1.62049 | 1.63258 | 36.2 |
| Prism 5 | 33.25 | 1.50727 | 1.50970 | 1.51518 | 64.4 |

| $i$ | $\phi$ | M |
|---|---|---|
| +22.2 | +75.3 | 1.96 |
| +19.8 | +68.9 | 1.74 |
| +15.8 | +59.1 | 1.52 |
| +9.0 | +41.9 | 1.28 |
| −3.0 | +12.5 | 1.06 |
| −48.0 | −58.9 | .64 |

*Example III*

|   | $\theta$ | $N_C$ | $N_d$ | $N_F$ | V |
|---|---|---|---|---|---|
| Prism 1 | 20.0 | 1.50727 | 1.50970 | 1.51518 | 64.4 |
| Prism 2 | 20.78 | 1.61546 | 1.62049 | 1.63258 | 36.2 |
| Prism 3 | 23.0 | 1.50727 | 1.50970 | 1.51518 | 64.4 |
| Prism 4 | 17.55 | 1.50727 | 1.50970 | 1.51518 | 64.4 |
| Prism 5 | 17.04 | 1.61546 | 1.62049 | 1.63258 | 36.2 |
| Prism 6 | 17.55 | 1.50727 | 1.50970 | 1.51518 | 64.4 |

| $i$ | $\phi$ | M |
|---|---|---|
| +28.6 | +77.7 | 1.97 |
| +22.1 | +59.1 | 1.49 |
| +16.0 | +39.0 | 1.25 |
| −5.0 | +5.5 | 1.03 |
| −52.5 | −65.97 | .65 |

*Example IV*

|   | $\theta$ | $N_C$ | $N_d$ | $N_F$ | V |
|---|---|---|---|---|---|
| Prism 1 | 17.0 | 1.50727 | 1.50970 | 1.51518 | 64.4 |
| Prism 2 | 17.81 | 1.61546 | 1.62049 | 1.63258 | 36.2 |
| Prism 3 | 20.0 | 1.50727 | 1.50970 | 1.51518 | 64.4 |
| Prism 4 | 17.55 | 1.50727 | 1.50970 | 1.51518 | 64.4 |
| Prism 5 | 16.93 | 1.61546 | 1.62049 | 1.63258 | 36.2 |
| Prism 6 | 17.55 | 1.50727 | 1.50970 | 1.51518 | 64.4 |

| $i$ | $\phi$ | M |
|---|---|---|
| +27.3 | +83.0 | 1.99 |
| +21.0 | +67.8 | 1.56 |
| +13.8 | +50.7 | 1.31 |
| −3.0 | +9.5 | 1.04 |
| −49.4 | −67.4 | .65 |

Example V

|  | θ | N_c | N_d | N_f | V |
|---|---|---|---|---|---|
| Prism 1 | 17.0 | 1.50727 | 1.50970 | 1.51518 | 64.4 |
| Prism 2 | 17.78 | 1.61546 | 1.62049 | 1.63258 | 36.2 |
| Prism 3 | 20.0 | 1.50727 | 1.50970 | 1.51518 | 64.4 |
| Prism 4 | 14.6 | 1.50727 | 1.50970 | 1.51518 | 64.4 |
| Prism 5 | 14.13 | 1.61546 | 1.62049 | 1.63258 | 36.2 |
| Prism 6 | 14.6 | 1.50727 | 1.50970 | 1.51518 | 64.4 |

| i | φ | M |
|---|---|---|
| +34.0 | +83.7 | 1.96 |
| +27.3 | +64.4 | 1.47 |
| +22.5 | +49.5 | 1.29 |
| −3.0 | +4.0 | 1.02 |
| −55.6 | −76.0 | .64 |

In Figures 1 and 2, a few typical rays are shown, including a central axial ray incident at angle $i$ to the normal to the rear surface of the rear compound prism and emerging from the front surface of the front compound prism in a direction substantially parallel to its original direction of incidence, and two further axial rays equally spaced on either side of the central axial ray. It will be noticed that these axial rays emerge from the front of the system much closer together than they were at incidence, thus illustrating the lateral pupil compression of rays passing from rear to front. Two oblique rays are also shown one on either side of the central axial ray and equally inclined thereto at incidence. These oblique rays emerge from the front of the system at greater inclination to the axial rays, thus illustrating lateral angular enlargement of rays passing from rear to front. It will be at once clear that rays passing from front to rear would have lateral pupil enlargement and lateral angular compression. The magnification of the system is proportional to the lateral pupil compression, and the reduced magnification of the system with the prisms adjusted to the positions shown in Figure 2 will be clear from the greater width of the emergent axial beam in Figure 2 as contrasted with that in Figure 1.

In the first two examples (Figures 1 and 3), the rear compound prism is in the form of a doublet, with the apex of the front element pointing towards the closed side and that of the rear element pointing away therefrom. In the remaining three examples Figures 4–6, the rear compound prism is in the form of a triplet, with the apex of the middle element pointing towards the closed side and the apices of the other two elements pointing away therefrom. The apex of the middle element of the triplet front compound prism, in all five examples, points away from the closed side, whilst the apices of the front and rear elements thereof point towards the closed side.

In each of the five examples, the same two materials are used in the front compound prism as in the rear compound prism, the difference between the two Abbé V numbers being 27.9 in Example I and 28.2 in the remaining examples. The material of lower Abbé V number is used for the middle element of the front triplet in all examples, for the front element of the rear doublet in Examples I and II, and for the middle element of the rear triplet in Examples III, IV and V.

The ratio of the prism angle of the front element of the front triplet to that of the rear element of such triplet is 0.28 in Example I, 0.23 in Example II, 0.87 in Example III and 0.85 in Examples IV and V. The sum of such two prism angles exceeds the prism angle of the middle element of the front triplet by 22.52 in Example I, 22.85 in Example II, 22.22 in Example III, 19.19 in Example IV and 19.22 in Example V, in each case in degrees.

In the first two examples, the prism angle of the rear element of the rear doublet exceeds that of the front element thereof by 20.98 degrees in Example I and by 21.17 degrees in Example II. In the remaining three examples, the sum of the prism angles of the outer element of the rear triplet exceeds the prism angle of the middle element of such triplet by 18.06 degrees in Example III, by 18.17 degrees in Example IV and by 15.07 degrees in Example V.

The second portion of the various tables give data for the useful ranges of magnification of the examples, and stops are provided to limit the adjustment to such range, since the abberration corrections are not maintained outside the range. In each case, the relationships are such that an incident ray which is an axial ray in any one position of adjustment remains an axial ray throughout the range of adjustment. Example I, with a somewhat smaller range of adjustment than the other examples, has the property that the angular movements of the two compound prisms bear an approximately linear relationship to one another. The arrangements are also such that, in each case, in the position of highest magnification, the two compound prisms are each approximately achromatic.

The rotational adjustment of the two compound prisms about axes parallel to the prism generators, to vary the magnification, may be effected separately by hand control, for example by means of hand knobs, as indicated at A in Figure 8, or the two prisms may be mechanically interlinked in various ways to correlate their movements. With the approximately linear relationship between the movements of the two compound prisms in the first example, it is practicable for the two prisms to be directly geared together at the appropriate ratio, as shown by the two gear wheels B, B¹ in Figure 9, one of the gear wheels carrying a projection C movable between two fixed stops C¹, C² to limit the adjusting movement.

Figure 10 illustrates an alternative form of mechanism, which can be used also when the relationship between the two movements is not linear. This mechanism comprises a disc D carried by one compound prism and having a cam slot D¹, within which runs a pin E and an arm E¹ carried by the other prism, the shape of the cam slot D¹ being chosen to suit the relationship between the two movements. The ends of the slot D¹ act as stops to limit the movement.

In the first two examples, employing a rear doublet, good correction for axial colour is maintained throughout the range of magnification, whilst in the other three examples, employing a rear triplet, not only good axial colour correction, but also good oblique colour correction is maintained throughout the magnification range.

The anamorphotic system according to the invention is primarily intended for use in front of a main objective, in a collimated beam of light. In cases where the light is not already collimated, a collimating lens system is provided in front of the anamorphotic system. Such an arrangement is illustrated in Figures 7 and 8, the main objective being indicated diagrammatically at F and the collimating lens system at G, such system having focal length equal to the distance from the plane H, which constitutes either the image plane or the object plane in accordance with the direction in which the rays pass through the system, the focal plane of the objective F (which is focussed on infinity) being indicated at J. If the system is used for the projection on to a screen of a laterally compressed image on a cinematograph film, the film is located at the short conjugate plane J on the rear side of the main objective F and the system will act to broaden out the laterally compressed film image to give a screen image at H in its normal undistorted proportions. If, on the other hand, the system is used for photographing a broad panoramic scene on to a cinematograph film, the scene to be photographed will lie in the neighbourhood of the long conjugate plane H in front of the system and the film in the short conjugate plane J, and the system will act to produce on the film a laterally compressed image of the scene, suitable for subsequent projection in the manner just described to produce a screen image in the original proportions of the panoramic scene.

The anamorphotic system according to the invention is also suitable for use in the manner forming the subject of the present applicant's copending patent application of the United States of America Serial No. 439,821, now Patent No. 2,798,411, in conjunction with a second similar anamorphotic system whose prism generators lie at right angles to those of the first system, in cooperation with a main objective and a collimating lens system, to increase the effective angular field of the objective for wide angle work. In such case the prisms may be fixed in position, or alternatively, the two systems may be adjustable to give variable magnifications in the two operative planes.

Such a double anamorphotic system is shown in two views at right angles respectively in Figures 11 and 12, the front system K, K$^1$ being appropriately larger than the rear system L, L$^1$. The main objective and collimating lens system are omitted from Figures 11 and 12, but are of course arranged respectively behind and in front of the double anamorphotic system in a manner analogous to that shown in Figures 7 and 8.

What I claim as my invention and desire to secure by Letters Patent is:

1. An anamorphotic optical system, comprising two refracting compound prisms, of which the first acts to deviate an incident ray in one sense and the second to deviate such ray in the reverse sense to an extent sufficient to include an axial ray within the useful field, the front compound prism being in the form of a cemented triplet consisting of a middle element made of material having Abbé V number less than 45 and two outer elements each with its apex pointing in a direction opposite to that of the middle element and made of material whose Abbé V number is greater than 45 and exceeds that of the middle element by at least 10, the front outer element having prism angle lying between 0.1 and 1.5 times the prism angle of the rear outer element, and the middle element having its prism angle between 9 and 25 degrees and more than 10 degrees less than the sum of the prism angles of the front and rear elements, whilst the rear element has its prism angle between 10 and 40 degrees.

2. An anamorphotic optical system as claimed in claim 1, including means whereby the two compound prisms can be angularly adjusted about axes parallel to the prism surfaces to vary the magnification of the system.

3. An anamorphotic optical system as claimed in claim 2, including means for interrelating the angular movements of the two compound prisms whereby an incident ray which in one position of adjustment emerges substantially parallel to its original direction of incidence will also emerge substantially parallel to its original direction of incidence in all other positions within the range of adjustment.

4. An anamorphotic optical system as claimed in claim 2, in which in one position in the range of adjustment each compound prism is approximately achromatic.

5. An anamorphotic optical system, comprising two refracting compound prisms, of which the first acts to deviate an incident ray in one sense and the second to deviate such ray in the reverse sense to an extent sufficient to include an axial ray within the useful field, the front compound prism being in the form of a cemented triplet consisting of a middle element made of material having Abbé V number less than 45 and two outer elements each with its apex pointing in a direction opposite to that of the middle element and made of material whose Abbé V number is greater than 45 and exceeds that of the middle element by at least 10, the front outer element having prism angle lying between 0.1 and 1.5 times the prism angle of the rear outer element, the rear compound prism being in the form of a cemented doublet consisting of a front element made of material having Abbé V number less than 45, and a rear element made of material having Abbé V number greater than 45 and at least 10 greater than that of the front element and having its apex pointing in a direction opposite to that of the front element and its prism angle at least 6 degrees greater than the prism angle of the front element.

6. An anamorphotic optical system as claimed in claim 5, in which the front element of the front compound prism has its prism angle between 0.1 and 0.67 times that of the rear element of such compound prism.

7. An anamorphotic optical system as claimed in claim 6, including means whereby the two compound prisms can be angularly adjusted about axes parallel to the prism surfaces to vary the magnification of the system.

8. An anamorphotic optical system as claimed in claim 7, including means for interrelating the angular movements of the two compound prisms whereby an incident ray which in one position of adjustment emerges substantially parallel to its original direction of incidence will also emerge substantially parallel to its original direction of incidence in all other positions within the range of adjustment.

9. An anamorphotic optical system as claimed in claim 5, in which the rear element of the front compound prism has its prism angle between 10 and 40 degrees, and the middle element of such compound prism has its prism angle between 9 and 25 degrees and less than the sum of the prism angles of the front and rear elements of such compound prism by more than 10 degrees.

10. An anamorphotic optical system as claimed in claim 5, including means whereby the two compound prisms can be angularly adjusted about axes parallel to the prism surfaces to vary the magnification of the system.

11. An anamorphotic optical system, comprising two refracting compound prisms, of which the first acts to deviate an incident ray in one sense and the second to deviate such ray in the reverse sense to an extent sufficient to include an axial ray within the useful field, the front compound prism being in the form of a cemented triplet consisting of a middle element made of material having Abbé V number less than 45 and two outer elements each with its apex pointing in a direction opposite to that of the middle element and made of material whose Abbé V number is greater than 45 and exceeds that of the middle element by at least 10, the front outer element having prism angle lying between 0.1 and 1.5 times the prism angle of the rear outer element, the rear compound prism being in the form of a triplet consisting of a middle element made of material having Abbé V number less than 45, and two outer elements each having its apex pointing in a direction opposite to that of the middle element and each made of material having Abbé V number greater than 45 and at least 10 greater than that of the middle element, the sum of the prism angles of the outer elements exceeding the prism angle of the middle element by at least 6 degrees.

12. An anamorphotic optical system as claimed in claim 11, in which the front element of the front compound prism has its prism angle between .67 and 1.5 times that of the rear element of such compound prism.

13. An anamorphotic optical system as claimed in claim 12, including means whereby the two compound prisms can be angularly adjusted about axes parallel to the prism surfaces to vary the magnification of the system.

14. An anamorphotic optical system as claimed in claim 13, including means for interrelating the angular movements of the two compound prisms whereby an incident ray which in one position of adjustment emerges substantially parallel to its original direction of incidence will also emerge substantially parallel to its original direction of incidence in all other positions within the range of adjustment.

15. An anamorphotic optical system as claimed in claim 11, in which the rear element of the front compound prism has its prism angle between 10 and 40 degrees, and the middle element of such compound prism has its prism angle between 9 and 25 degrees and less than the sum of the prism angles of the front and rear elements of such compound prism by more than ten degrees.

16. An anamorphotic optical system as claimed in claim 11, including means whereby the two compound prisms can be angularly adjusted about axes parallel to the prism surfaces to vary the magnification of the system.

References Cited in the file of this patent

UNITED STATES PATENTS

| | | |
|---|---|---|
| 1,647,631 | Ives | Nov. 1, 1927 |
| 1,898,787 | Newcomer | Feb. 21, 1933 |
| 1,905,442 | Coors | Apr. 25, 1933 |
| 1,931,992 | Newcomer | Oct. 24, 1933 |
| 1,932,082 | Newcomer | Oct. 24, 1933 |
| 2,023,217 | Benford | Dec. 3, 1935 |
| 2,048,284 | Newcomer | July 21, 1936 |
| 2,088,660 | Newcomer | Aug. 3, 1937 |
| 2,375,634 | Dunning | May 8, 1945 |

FOREIGN PATENTS

| | | |
|---|---|---|
| 8,512 | Great Britain | of 1898 |
| 338,962 | Great Britain | Dec. 1, 1930 |
| 1,091,814 | France | Nov. 3, 1954 |
| 1,101,419 | France | Apr. 20, 1955 |